(12) United States Patent
Su et al.

(10) Patent No.: US 8,098,951 B2
(45) Date of Patent: Jan. 17, 2012

(54) IMAGE SHARPENING TECHNIQUE

(75) Inventors: Yeping Su, Camas, WA (US);
Christopher A. Segall, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 812 days.

(21) Appl. No.: 12/228,774

(22) Filed: Aug. 15, 2008

(65) Prior Publication Data
US 2010/0040302 A1 Feb. 18, 2010

(51) Int. Cl.
*G06K 9/40* (2006.01)
*G06T 5/00* (2006.01)

(52) U.S. Cl. .................. 382/261; 382/263; 382/275

(58) Field of Classification Search .......... 382/260, 382/261, 263, 275; 348/606
See application file for complete search history.

(56) References Cited

U.S. PATENT DOCUMENTS

| | | | |
|---|---|---|---|
| 4,463,381 A | 7/1984 | Powell et al. | |
| 5,081,692 A | 1/1992 | Kwon et al. | |
| 5,282,030 A | 1/1994 | Nishimura et al. | |
| 5,825,936 A | 10/1998 | Clarke et al. | |
| 6,289,133 B1 | 9/2001 | Oshino | |
| 6,731,823 B1 * | 5/2004 | Gallagher et al. | 382/266 |
| 2001/0038716 A1 | 11/2001 | Tsuchiya et al. | |
| 2004/0013310 A1 | 1/2004 | Suino et al. | |
| 2004/0183812 A1 * | 9/2004 | Raskar et al. | 345/582 |
| 2005/0089239 A1 * | 4/2005 | Brajovic | 382/266 |
| 2005/0286795 A1 * | 12/2005 | Zhang | 382/268 |
| 2006/0103892 A1 | 5/2006 | Schulze et al. | |
| 2007/0201759 A1 | 8/2007 | Lee et al. | |
| 2008/0037044 A1 | 2/2008 | Tse et al. | |
| 2008/0095466 A1 | 4/2008 | Kinrot et al. | |
| 2008/0152247 A1 * | 6/2008 | Oh et al. | 382/260 |
| 2008/0174699 A1 | 7/2008 | Suzuki et al. | |
| 2009/0220169 A1 * | 9/2009 | Bennett et al. | 382/268 |

FOREIGN PATENT DOCUMENTS

| | | |
|---|---|---|
| JP | 2004-266757 | 9/2004 |
| JP | 2006-317406 | 11/2006 |
| JP | 2007-317109 | 12/2007 |
| JP | 2008-42407 | 2/2008 |
| JP | 2008-123349 | 5/2008 |
| JP | 2008-141658 | 6/2008 |

OTHER PUBLICATIONS

Yuki Ishii; Fresh Eyes—Introduction of Video Research Laboratory; The Journal of Institute of Image Information and Television Engineers; Jan. 1, 2008; vol. 62 No. 1; pp. 52-54.

* cited by examiner

*Primary Examiner* — Jon Chang

(74) *Attorney, Agent, or Firm* — Chernoff Vilahuer, McClung & Stenzel, LLP (57) ABSTRACT

A sharpening technique for digital images for presentation on a display.

30 Claims, 6 Drawing Sheets

IMAGE SHARPENING TECHNIQUE

BACKGROUND OF THE INVENTION

The present invention relates to sharpening of digital images and video for presentation on a display.

The resolution of a typical liquid crystal display is approximately 720×480 which is on the order of standard definition television. The resolution of a typical very high resolution diagonal display is 4096×2160 and typically has viewing distances that are less than 2 picture heights. In order to display an image on a display in a aesthetically pleasing manner sharpening of the image is typically performed. The lack of sharpness typically results from imperfections in the captures process and/or loss of details due to image compression. However, sharpening of the image tends to result in annoying artifacts.

The traditional approaches to sharpening, such as using an unsharp mask, generally result in the introduction of visible degradation into the image being sharpened. The visual degradation is primarily due to enhancing the high frequency components and noise that often dominates the high frequency bands of an image. To moderate the enhancement of the visible degradation of the image, the amount of sharpening performed is controlled.

It is desirable to increase the sharpness of the image content while at the same time suppressing the noise in the resulting image.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Image sharpening techniques are designed to enhance the high frequency aspects of the image. High frequency aspects, such as edges around major features of the image, are particularly desirable to sharpen in order to improve the visual appearance of the image to the viewer. However sharpening high frequency aspects, such as noise in the texture regions of the image, are not desirable because it degrades the visual appearance of the image to the viewer. These tradeoff are generally contradictory to one another, while on the one hand a desire to enhance the high frequency aspects of portions of the image while on the other hand a desire not to enhance the high frequency aspects of other portions of the image.

Attempting to develop a universal sharpening filter has proved to be elusive. It has been determined that sharpening an image is best done using multiple different filters or otherwise a filter applied to only a portion of the image. Each of the different filters should filter the image in a different manner so that the beneficial aspects of each of the filters may be taken advantage of. It is to be understood that any filter maybe used, such as those that sharpen the image.

Figure 1:
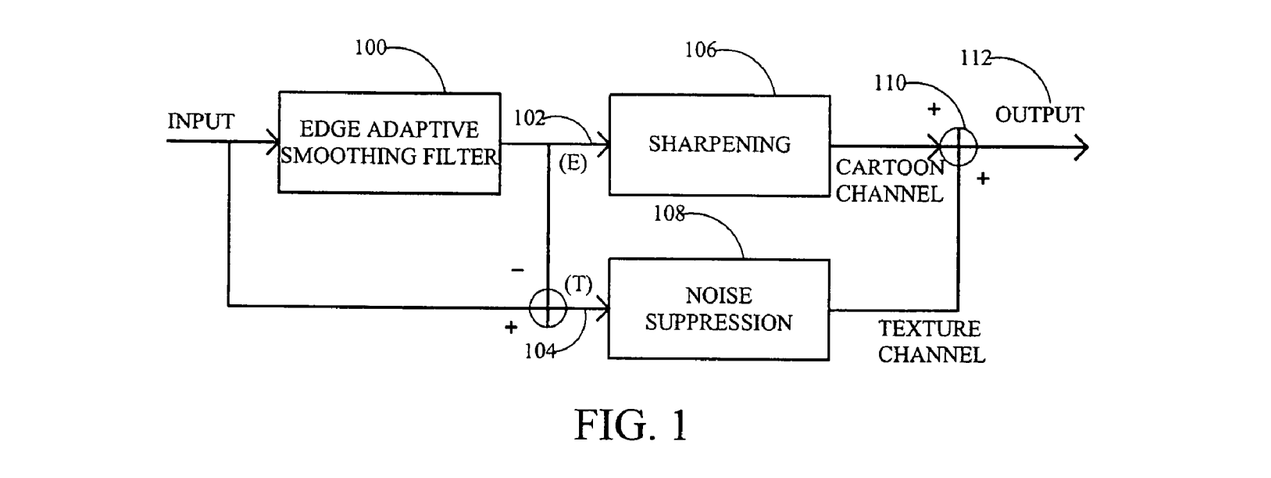
FIG. 1 illustrates image sharpening without resolution change.

Referring to FIG. 1, it was determined that the system may preprocess the incoming image with a non-linear edge-adaptive smoothing filter 100 that is used to separate the image into multiple "channels". It is noted that these "channels" need not be frequency bands, or directly related to the frequency domain. The filter may be referred to as an edge-adaptive smoothing filter or any other suitable filter. One channel 102 may contain the edge content and slowly varying "flat" regions of the image where edges (which generally contain high spatial frequencies) are retained and remain generally sharp, but textures (which also contain high spatial frequencies) are generally filtered out. The other channel 104 may contain the textures of the image minus edges. A linear filter is not especially suitable for such selective filtering.

These two channels, namely, texture information (T) 104 and edge+flat regions 102 (E), can be used in a number of ways to produce a high quality sharpened image. One approach is to use a sharpening technique 106 on the edge+flat regions 102 to enhance the image. The edge+flat regions 102 is generally noise free so the enhancement of that channel does not substantially increase the resulting noise in the final image. A noise suppression technique 108 on the texture channel reduces 104 the noise that is contained in that channel. Thereafter, the two channels T 104 and E 102 are recombined 110 into the final output 112. Accordingly, those edge aspects of the image that are desirable to sharpen are suitably enhanced without substantial enhancement of the noise, while the other aspects of the image that are not desirable to sharpen are suitably attenuated in a manner to reduce the noise.

Figure 2:
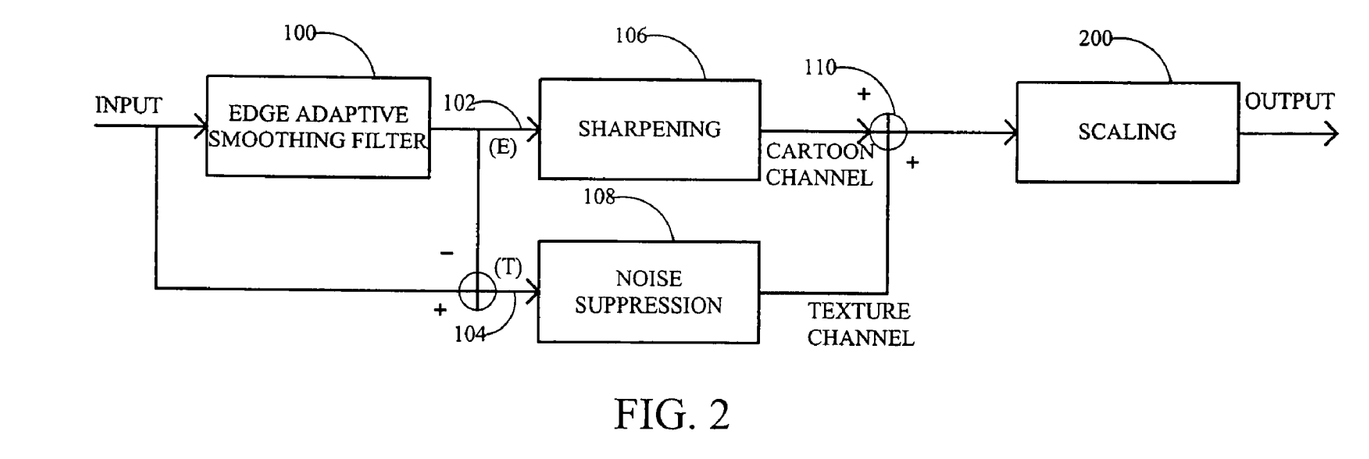
FIG. 2 illustrates image sharpening with resolution change.
Figure 3:
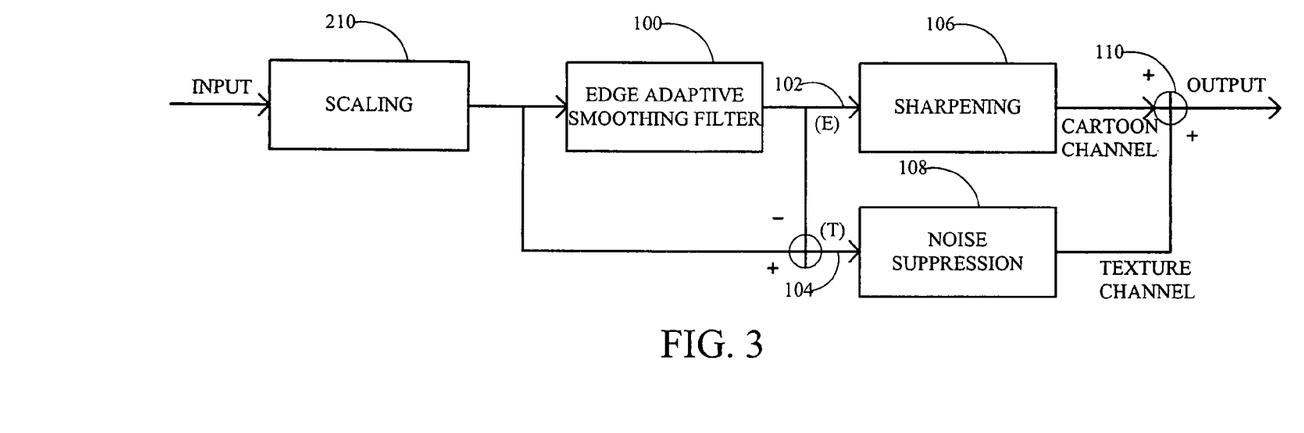
FIG. 3 illustrates another image sharpening with resolution change.

When the input resolution and the desired output resolutions are different, one or more scaling operations may be included to re-scale the image. Referring to FIG. 2, one technique for scaling the image is to include an image scaling operation 200 at the output thereof. In this manner, the image processing pipeline may process the image at a first input resolution then use a high quality scaling operation 200 to achieve the desired output results. This manner of processing maintains the image processing pipeline with relatively low complexity Referring to FIG. 3, another technique for scaling the image is to include an image scaling operation 210 at the input thereof. In this manner, the image processing pipeline may be designed to process images at a single image resolution that is the same as the scale provided at the output of the input image scaling operation, which decreases the complexity of the image processing pipeline. The image processing pipeline may be optimized for a single image scale.

Figure 4:
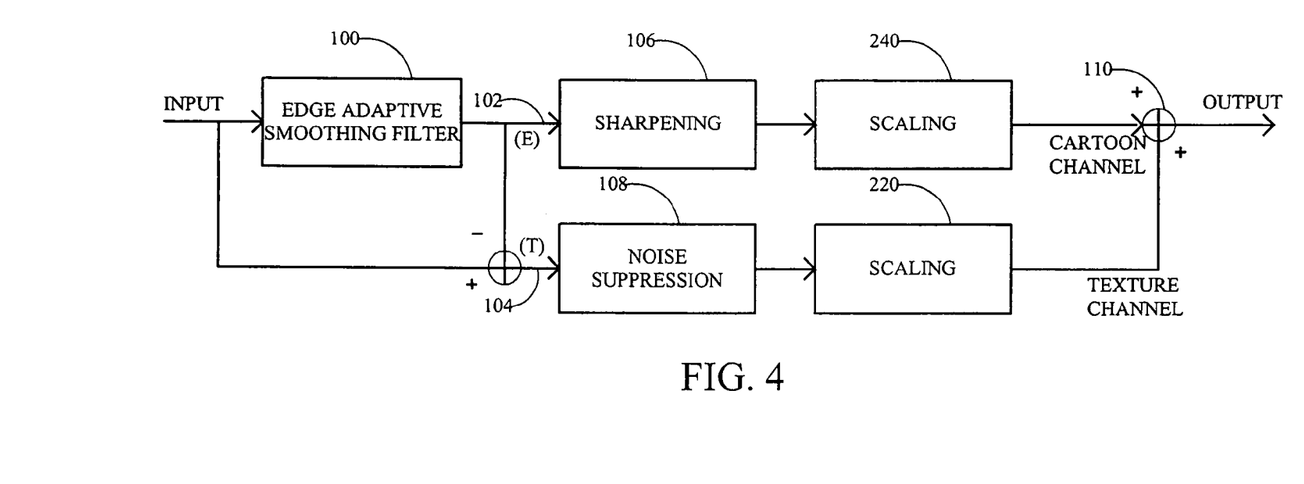
FIG. 4 illustrates another image sharpening with resolution change.

Referring to FIG. 4, another technique for scaling the image is to include an image scaling operation 220 after the noise suppression in the texture channel (T). The texture channel has particular image characteristics and the scaling filter may be designed to accommodate the particular image characteristics. The combination of the scaling operation and noise suppression may be such that improved image characteristics are achieved. An image scaling operation 240 after the sharpening in the flat images+edges channel (E). The channel E has particular image characteristics and the scaling filter may be designed to accommodate the particular image characteristics. The combination of the scaling operation and sharpening may be such that improved image characteristics are achieved.

Figure 5:
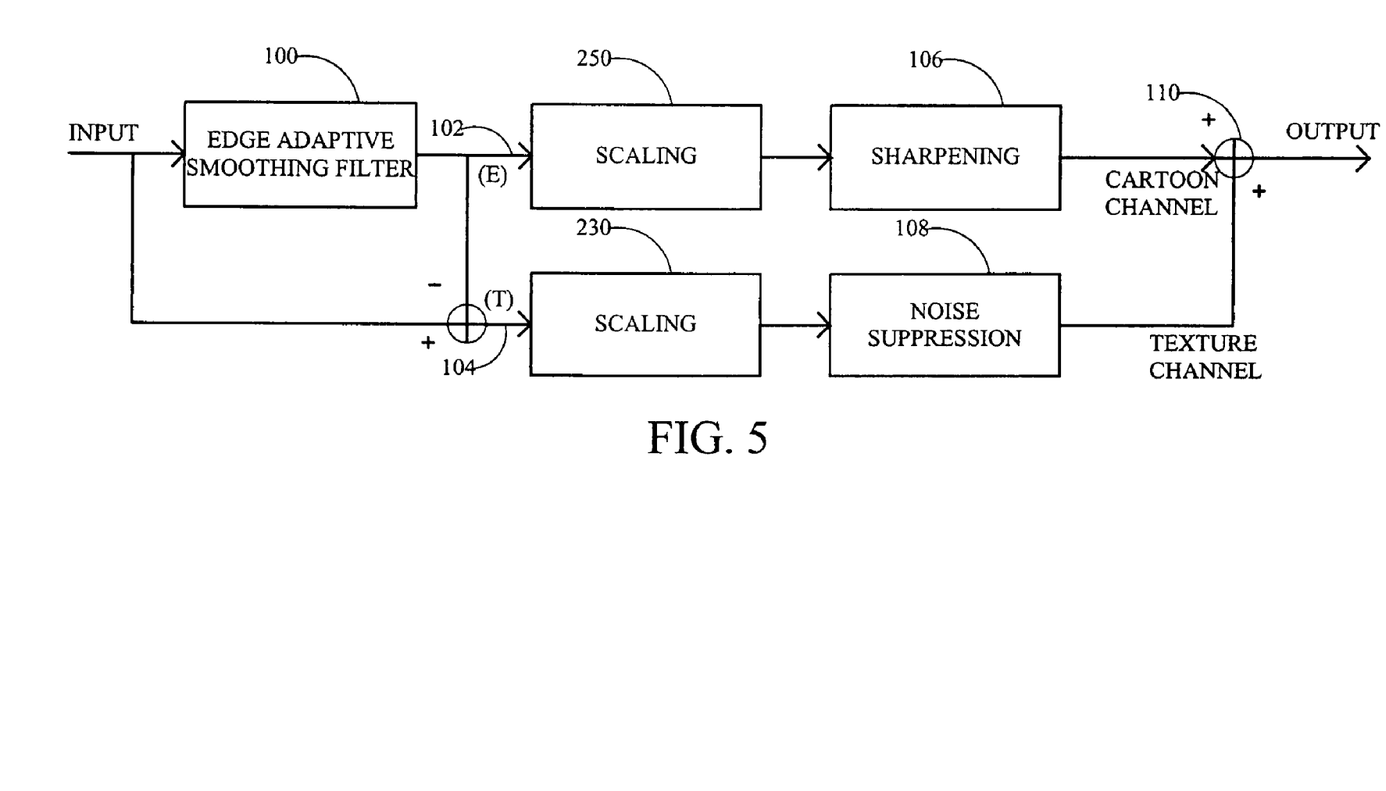
FIG. 5 illustrates another image sharpening with resolution change.

Referring to FIG. 5, another technique for scaling the image is to include an image scaling operation 230 before the noise suppression in the texture channel (T). The scaling may be designed to accommodate the added noise in the channel, that is thereafter suppressed by the noise suppression. The combination of the scaling operation and noise suppression may be such that improved image characteristics are achieved. An image scaling operation 250 before the sharpening in the flat images+edge channel (E). The scaling may be designed to accommodate the reduced noise in the channel. The combination of the scaling operation and sharpening may be such that improved image characteristics are achieved.

Figure 6:
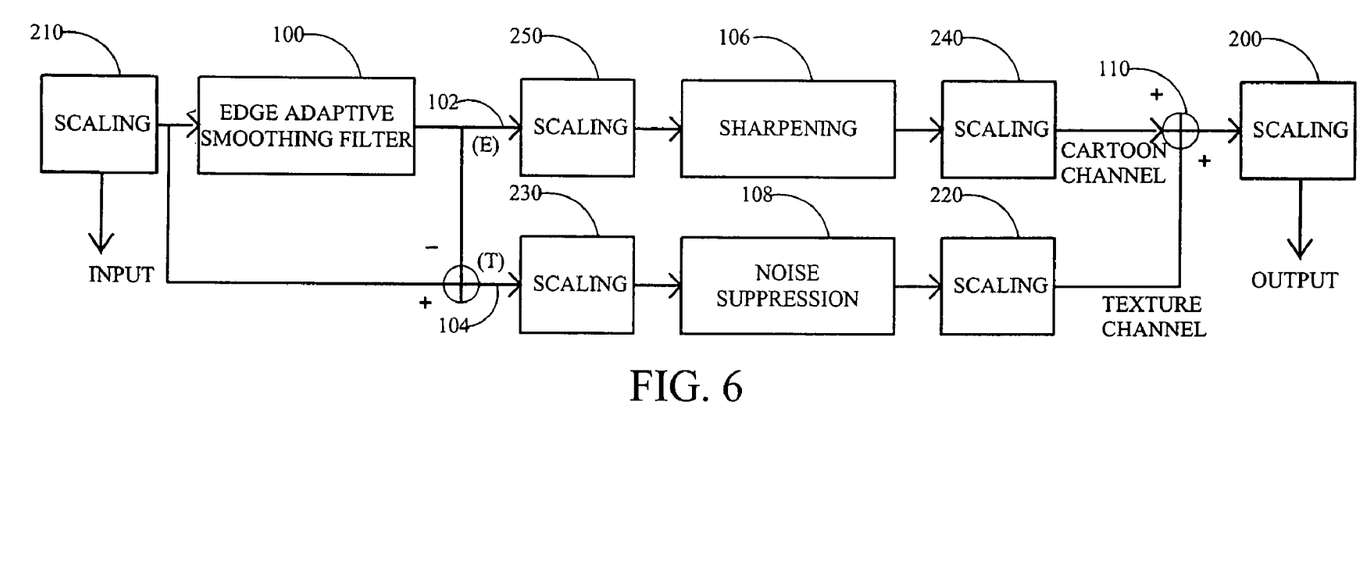
FIG. 6 illustrates another image sharpening with resolution change.

Referring to FIG. 6, depending on the particular implementation requirements, one or more of the scaling operations may be included together with the system. The combination of the different scaling operations achieves a robust design that is readily adaptable to different images and system requirements. It is to be understood that each of the scaling operations may be the same or different. By way of example, the scaling 230 may be a bilinear upscaling operation whereas scaling operation 250 may be a non-linear scaling operation.

More specifically, the edge adaptive smoothing filter 100 applies signal dependent processing to separate strong object edges from fine texture and noises. As one specific example, the system may use bi-lateral filters. One such bilateral filter may be formulated as $$\hat{x}[k] = \frac{\sum_{n=-N}^{N} W[k,n] x[k-n]}{\sum_{n=-N}^{N} W[k,n]},$$

which consists of a weight calculation step and a weighted averaging step. For notational simplicity one may assume a one-dimensional filter but there is no loss of generality in doing that. Here x is the input signal and $\hat{x}$ is the filtered signal and the filter kernel W consists of a spatial kernel $W_s$, and a range kernel $W_R$: $W[k,n]=W_s[k,n] \cdot W_R[k,n]$. Boxcar, gaussian and triangular kernels may likewise be used for kernels. Other techniques, such as anisotropic diffusion and adaptive smoothing may likewise be used. In general, any filter that tends to preserve edge features while reducing noise may be used.

Figure 7:
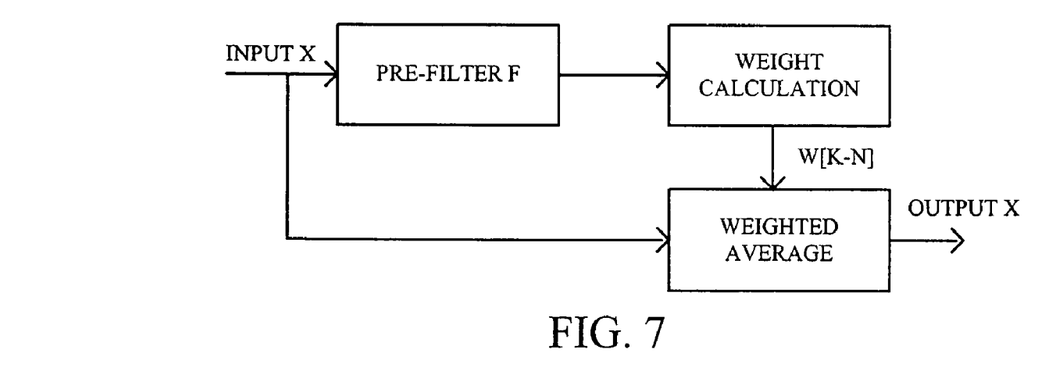
FIG. 7 illustrates bilateral filter with pre-filtering.

The kernel calculation in bilateral filters is signal dependent and serves to differentiate strong object edges from texture/noise/artifact. This is achieved by assigning lower weights to pixels in the filter window whose intensity values are far from the center pixel intensity. Preferably, a pre-filtering step f(x) before the weight calculation is incorporated to achieve better noise and artifact robustness. By reducing the noises and artifacts, the system may improve the weight calculation which in turn improves the filtered outcome. This is illustrated as a block diagram in FIG. 7. Several choices of f may be used, including for example, linear low pass filters and median filters. Other nonlinear smoothing filters can also be applied.

It is desirable to suppress noise in the texture channel. Since the texture channel primarily contains all the noise and artifacts, attenuating the texture channel will suppress the amount of noise and artifacts in the final output. This can achieved by applying a weight ω to the texture channel, and the weighting can be either spatially invariant or spatially variant. In the case of spatially variant texture channel weighting, the information from the bilateral filter can be leveraged to determine the amount of suppression. More specifically an edge measure $$E[k] = \frac{W[k,0]}{\sum_{n=-N}^{N} W[k,n]}$$

can be derived from the bilateral filter, with higher E values indicating that the current pixel is closer to an edge. Subsequently the texture channel weights can be derived by $\omega[k] = (1-E[k])*\alpha+\beta$. Here $\alpha,\beta$ are introduced to control the range and mean for the texture channel weighing.

It is desirable to suppress coding artifacts in the texture channel. Most of the displayed contents are compressed one way or another, and inevitably contain various compression artifacts. Among those the most visually objectionable is the blocking artifacts due to the non-overlapping block transforms used in most existing compression algorithms. The blocking artifact manifest itself as small square blocks all over the decompressed images, and most noticeably in flat regions. A deblocking filter may be applied on the texture channel to suppress blocking artifacts. The main difference between the texture channel deblocking and a conventional deblocking is that the texture channel is very noisy and the real object edges are not present or not as strong. One may apply the following steps for the deblocking of the texture channel:

First, calculate an edge measure for each pixel by using $$E[k] = \frac{W[k,0]}{\sum_{n=-N}^{N} W[k,n]}$$

and an edge measure for a block by summing up the per-pixel measure.

Second, in the texture channel deblocking process, control the amount of filtering per blocking edge using the edge measure calculated in the previous step. The smaller the edge measure, the stronger the filter is.

Figure 8:
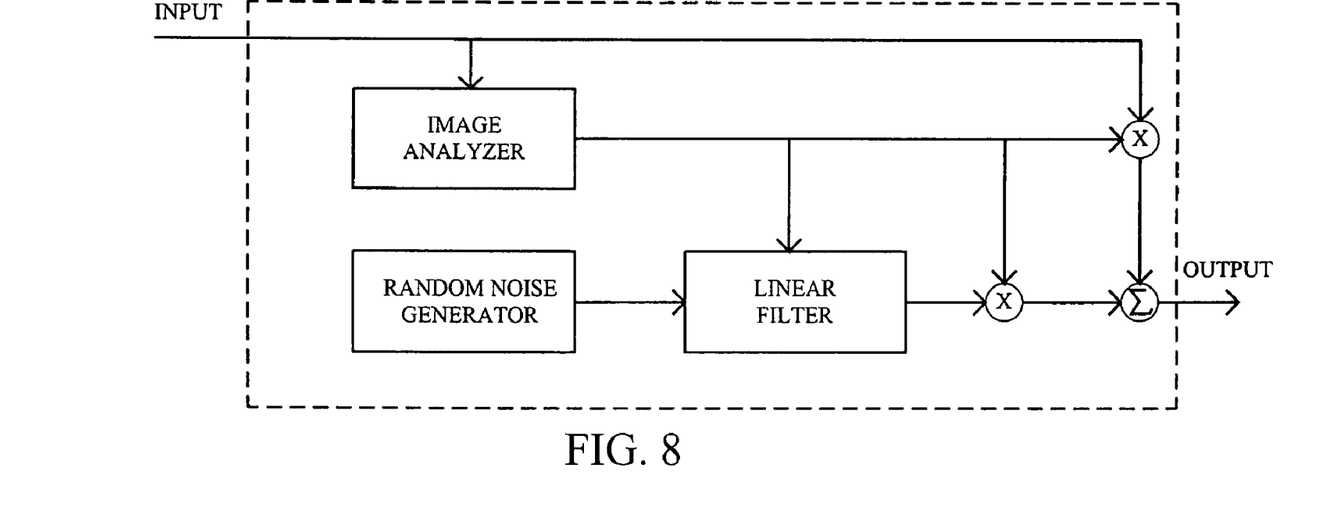
FIG. 8 illustrates comfort noise/texture equalization for noise suppression.

It is desirable to modify the image to provide a sufficient amount of high frequency content so as to have a pleasing appearance. Attenuating the texture channel reduces the noise at the expense of also removing fine detail. This may reduce the perceived sharpness to a human observer, as the resulting output image has less high frequency information than expected. To overcome this issue, texture synthesis may be added to the image to mask structured, coding noise artifacts without reducing high frequency information. A block diagram for the comfort noise is shown in FIG. 8. To be clear, FIG. 8 provides a more detailed description of the noise suppression block shown in FIG. 1.

As can be seen from FIG. 8, the noise suppression process takes the texture channel as input. The texture data is then analyzed by an image analysis process. In one embodiment, the image analyzer extracts the variance and correlation of image regions within the texture channel. Of course, other statistics may be extracted. For example, the location of edges may be identified. By way of example, the mean value of the image region may be extracted.

Outputs from the image analysis block are used to control filtering and multiplication operations. For example, the correlation estimate controls the linear filter shown in FIG. 8. Additionally, the noise power estimate controls the multiplication operator that follows the linear filter output. Furthermore, the mean and edge information is used to control both the multiplication following the linear filter as well as the multiplication of the input data. Finally, the scaled input texture channel and the modified random noise are added and provided as output of the noise suppression component.

In many cases, the non-linear splitting filter will not exactly separate the edges from the textures. Accordingly, some information will leak into each channel from the other channel. Consequently, the adding back together of the two channels may be based upon sensed image characteristics to achieve the final image.

Figure 9:
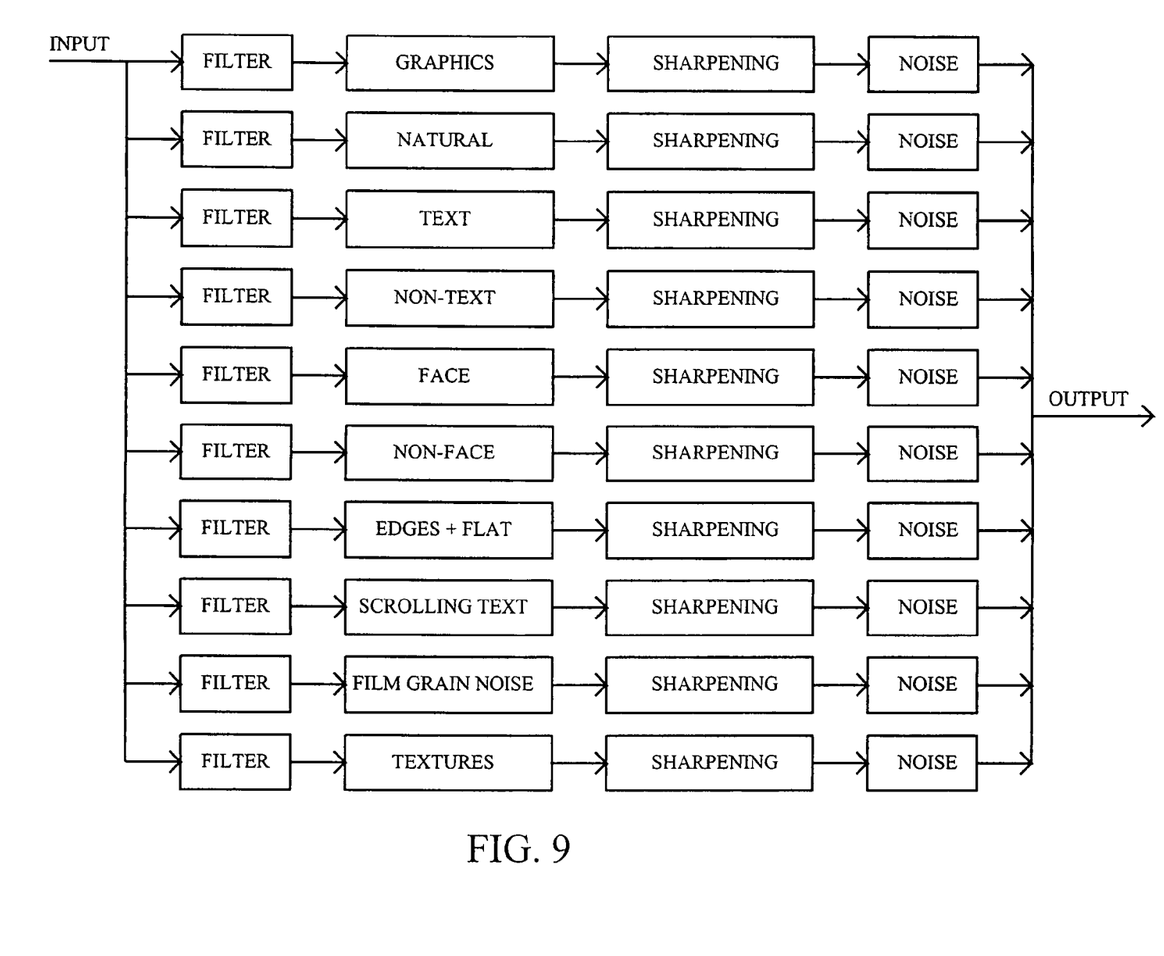
FIG. 9 illustrates another image sharpening with resolution change.

Referring to FIG. 9, a more generalized framework may be used for an improved scaling technique. The technique includes a multi-channel spatial decomposition which may decompose the image into any suitable set of channels. The decomposition may be linear or non-linear. In addition, the spatial decomposition may be more than two channels, if desired. The channels may include characteristics, such as for example, graphics versus natural, text versus non-text, face versus non-face, texture, and edges+flat region, scrolling text, film grain noise. Depending on the particular implementation, the input image for one or more channels may not be filtered but rather scaled in any manner. The channel specific scaling may use any suitable set of filters or omitted. The channel specific noise reduction may use any suitable set of filters or omitted. If desired, the filters may also include temporal information of a video when scaling a particular image. Blending together of the separate channels may be done using any suitable technique.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for modifying an image from a first sharpness to a modified image having a different sharpness:
   (a) receiving said image having said first sharpness;
   (b) filtering said image with an image filter to result in the creation of a first channel and a second channel, wherein said first channel includes primarily texture information and said second channel includes primarily edge and flat region information;
   (c) filtering said first channel to attenuate higher frequency content of said image in said first channel;
   (d) filtering said second channel to sharpen said image in said second channel;
   (e) combining said first channel and said second channel to form said modified image having said different sharpness; and
   (f) where said filtered image satisfies at least one of the following criteria:
      (1) as a result of step (c), said filtered image is at least one of previously and subsequently scaled with a scaling filter on the image in a first channel; and
      (2) as a result of step (d), said filtered image is at least one of previously and subsequently scaled with a scaling filter on the image in a second channel.

2. The method of claim 1 wherein said image filter is a non-linear filter.

3. The method of claim 2 wherein said non-linear filter is an adaptive filter.

4. The method of claim 3 wherein said adaptive filter is edge adaptive.

5. The method of claim 4 wherein said edge adaptive filter includes a smoothing function.

6. The method of claim 1 wherein said filtering further creates a third channel.

7. The method of claim 6 wherein said filtering further creates a fourth channel.

8. The method of claim 7 wherein said filtering further creates a fifth channel.

9. The method of claim 8 wherein said filtering further creates a sixth channel.

10. The method of claim 1 wherein said modified image is subsequently scaled with a scaling filter.

11. The method of claim 1 wherein said image is previously scaled with a scaling filter prior to being filtered with said image filter.

12. The method of claim 1 wherein said filtered image as a result of step (c) is previously scaled with a scaling filter on the image in said first channel.

13. The method of claim 12 wherein said filtered result of step (d) is scaled with a scaling filter on the image in said second channel.

14. The method of claim 13 wherein said scaling filter of said first channel and said scaling filter of said second channel are different filters.

15. The method of claim 1 wherein said filtered image as a result of step (c) is subsequently scaled with a scaling filter in said first channel.

16. The method of claim 15 wherein said filtered result of step (d) is scaled with a scaling filter on the image in said second channel.

17. The method of claim 16 wherein said scaling filter of said first channel and said scaling filter of said second channel are different filters.

18. The method of claim 1 wherein said filtered image as a result of step (d) is previously scaled with a scaling filter on the image in said second channel.

19. The method of claim 18 wherein said filtered result of step (c) is scaled with a scaling filter on the image in said first channel.

20. The method of claim 19 wherein said scaling filter of said first channel and said scaling filter of said second channel are different filters.

21. The method of claim 1 wherein said filtered image as a result of step (d) is subsequently scaled with a scaling filter in said second channel.

22. The method of claim 21 wherein said filtered result of step (c) is scaled with a scaling filter on the image in said first channel.

23. The method of claim 22 wherein said scaling filter of said first channel and said scaling filter of said second channel are different filters.

24. The method of claim 1 further comprising using pre-filters to reduce noise.

25. The method of claim 1 further comprising filtering in step (c) is based upon information obtained from step (b).

26. The method of claim 25 wherein an edge measure is calculated from step (b).

27. The method of claim 26 wherein said edge measure is used as the basis to attenuate said first channel.

28. The method of claim 1 further comprising adding synthesized high frequency content to said modified image.

29. A method for modifying an image from a first sharpness to a modified image having a different sharpness:

(a) receiving said image having said first sharpness;
(b) filtering said image with an image filter to results in the creation of a first channel and a second channel, wherein said first channel includes primarily texture information and said second channel includes primarily edge and flat region information;
(c) filtering said first channel to attenuate higher frequency content of said image in said first channel;
(d) filtering said second channel to sharpen said image in said second channel;
(e) combining said first channel and said second channel to form said modified image having said different sharpness; and
(f) using pre-filters to reduce compression artifacts in said image.

30. A method for modifying an image from a first sharpness to a modified image having a different sharpness:
(a) receiving said image having said first sharpness;
(b) filtering said image with an image filter to results in the creation of a first channel and a second channel, wherein said first channel includes primarily texture information and said second channel includes primarily edge and flat region information;
(c) filtering said first channel to attenuate higher frequency content of said image in said first channel;
(d) filtering said second channel to sharpen said image in said second channel;
(e) combining said first channel and said second channel to form said modified image having said different sharpness; and
(f) using at least one pre-filter to reduce at least one of compression artifacts and noise, wherein said at least one pre-filter is performed prior to a weight calculation included with said image filter.

* * * * *